United States Patent
Yasumiishi et al.

(10) Patent No.: US 10,431,817 B2
(45) Date of Patent: Oct. 1, 2019

(54) ELECTRODE MATERIAL FOR LITHIUM-ION SECONDARY BATTERY AND METHOD FOR MANUFACTURING THE SAME, ELECTRODE FOR LITHIUM-ION SECONDARY BATTERY, AND LITHIUM-ION SECONDARY BATTERY

(71) Applicant: SUMITOMO OSAKA CEMENT CO., LTD., Tokyo (JP)

(72) Inventors: Hirofumi Yasumiishi, Chiba (JP); Ryuuta Yamaya, Chiba (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 49 days.

(21) Appl. No.: 15/716,883

(22) Filed: Sep. 27, 2017

(65) Prior Publication Data

US 2018/0277838 A1 Sep. 27, 2018

(30) Foreign Application Priority Data

Mar. 24, 2017 (JP) .................................. 2017-059496

(51) Int. Cl.

| | | |
|---|---|---|
| H01M 4/36 | (2006.01) | |
| H01M 4/136 | (2010.01) | |
| H01M 10/0525 | (2010.01) | |
| H01M 4/04 | (2006.01) | |
| H01M 4/58 | (2010.01) | |
| H01M 4/583 | (2010.01) | |
| H01M 4/133 | (2010.01) | |
| H01M 4/1397 | (2010.01) | |
| H01M 4/62 | (2006.01) | |
| H01M 4/02 | (2006.01) | |

(52) U.S. Cl.
CPC ......... *H01M 4/366* (2013.01); *H01M 4/0416* (2013.01); *H01M 4/0471* (2013.01); *H01M 4/133* (2013.01); *H01M 4/136* (2013.01); *H01M 4/1397* (2013.01); *H01M 4/583* (2013.01); *H01M 4/5825* (2013.01); *H01M 4/625* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2014/0147586 A1 | 5/2014 | Liang et al. | |
| 2015/0099159 A1 | 4/2015 | Hoshina et al. | |
| 2015/0380725 A1* | 12/2015 | Mine ..................... | H01M 4/366 429/231.8 |

FOREIGN PATENT DOCUMENTS

| | | | |
|---|---|---|---|
| JP | 2008-311067 | A | 12/2008 |
| JP | 2012-195156 | A | 10/2012 |
| JP | 2013-246936 | A | 12/2013 |
| JP | 2014-032803 | A | 2/2014 |
| JP | 2015-076133 | A | 4/2015 |
| JP | 5999240 | B1 | 9/2016 |
| JP | 2017-069177 | A | 4/2017 |
| JP | 2017069177 | A | 6/2017 |
| JP | 6156537 | A | 7/2017 |

OTHER PUBLICATIONS

Japanese Office Action from Application No. 2017-059469 dated Oct. 24, 2017.

* cited by examiner

*Primary Examiner* — Maria Laios
(74) *Attorney, Agent, or Firm* — Greenblum & Bernstein, P.L.C.

(57) ABSTRACT

An electrode material includes an inorganic particle and a carbonaceous film coating a surface of the inorganic particle, in which an amount of carbon is 0.8 to 2.5% by mass, and volume of micropores in a micropore diameter range of 2 to 200 nm is $3\times10^{-2}$ to $3\times10^{-1}$ cm$^3$/g. A method for manufacturing an electrode material includes a step of immersing the inorganic particle in an aqueous solution, a step of producing a slurry including the inorganic particle immersed in an aqueous solution, a carbonaceous film precursor, and water, a step of producing a dried substance of the slurry, and a step of calcinating the dried substance in a non-oxidative atmosphere, in which an amount of the carbonaceous film precursor blended into the inorganic particle is 1.0 to 5.0 parts by mass. A lithium-ion secondary battery includes a cathode that is the electrode; an anode; and a non-aqueous electrolyte.

6 Claims, No Drawings

ELECTRODE MATERIAL FOR LITHIUM-ION SECONDARY BATTERY AND METHOD FOR MANUFACTURING THE SAME, ELECTRODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2017-059496 filed Mar. 24, 2017, the disclosure of which is herein incorporated by reference in its entirety.

BACKGROUND OF THE INVENTION

Field of the Invention

The present invention relates to an electrode material for a lithium-ion secondary battery and a method for manufacturing the same, an electrode for a lithium-ion secondary battery, and a lithium-ion secondary battery.

Description of Related Art

Recently, in the rapid progress of technical development of clean energy, efforts to form earth-friendly environments such as the distribution of petroleum dependency-reduced, zero-emission, and power-saving products have become necessary. Particularly, recently, large-capacity storage batteries supplying electric energy to electric vehicles, large-capacity storage batteries supplying electric energy in the case of emergency or disaster, and secondary batteries supplying electric energy to mobile information devices, mobile information terminals, and the like have been attracting attention. As secondary batteries, for example, lead storage batteries, alkali storage batteries, lithium-ion batteries, and the like are known. Particularly, lithium-ion batteries are capable of achieving size reduction, weight reduction, and higher capacity and, furthermore, have excellent characteristics such as a high output and a high energy density. Due to these facts, lithium-ion secondary batteries have been commercialized as high-output power supplies for electric devices mainly including electric vehicles, and active development is underway throughout the globe regarding materials for next-generation lithium-ion secondary batteries.

In addition, recently, as collaboration of large-capacity storage batteries supplying electric energy and houses, home energy management systems (HEMS) have been attracting attention. HEMS is a system for managing automatic control, the optimization of electric power supply and demand, and the like and cleverly consuming energy by integrating information regarding domestic electricity and control systems such as smart home appliances, electric vehicles, and photovoltaic power generation.

Electrode active materials that are ordinarily used for cathodes of lithium-ion batteries in practical use at the moment are $LiCoO_2$ and $LiMnO_2$. However, Co is not evenly distributed in the Earth and is a rare resource, and thus, in a case in which a large amount of Co is used, there is a problem in that the product costs increase and stable supply becomes difficult. Therefore, as alternative cathode active materials of $LiCoO_2$, active research and development is underway regarding cathode active materials such as spinel-based $LiMn_2O_4$, ternary $LiNi_{1/3}Mn_{1/3}CO_{1/3}O_2$, lithium iron oxide ($LiFeO_2$), and lithium iron phosphate ($LiFePO_4$). Among these cathode materials, $LiFePO_4$ having an olivine structure is attracting attention as a cathode material that is not only safe but also has no problem from the resource and cost viewpoint. Olivine-based cathode materials represented by $LiFePO_4$ include phosphorus as a constituent element and form a strong covalent bond with oxygen. Therefore, compared with cathode materials such as $LiCoO_2$, the olivine-based cathode material is a material which has no concern of emitting oxygen at a high temperature, also has no concern of a risk of ignition due to the oxidation and decomposition of electrolytic solutions, and has excellent safety.

However, in $LiFePO_4$ having the above-described advantages, there is a problem with poor electron conductivity. This poor electron conductivity is considered to result from the slow diffusion of lithium ions in the active material which is attributed to the structure and low electron conductivity. Therefore, as an electrode material having improved electron conductivity, for example, an electrode material in which multiple primary particles of an electrode active material made of $Li_xA_yB_zPO_4$ (A represents one or more selected from the group consisting of Co, Mn, Ni, Fe, Cu, and Cr, B represents one or more selected from the group consisting of Mg, Ca, Sr, Ba, Ti, Zn, B, Al, Ga, In, Si, Ge, Sc, Y, and rare earth elements, $0<x<2$, $0<y<1.0$, and $0\leq z<1.5$) gather so as to form a secondary particle, carbon is interposed between the primary particles as an electron-conducting substance, and the surface of the electrode active material is coated with a carbonaceous film has been proposed. In addition, as a method for manufacturing the electrode material, a method in which a slurry including the electrode active material or a precursor of the electrode active material and an organic compound is sprayed and dried so as to generate a granulated body, and the granulated body is thermally treated in a non-oxidative atmosphere of 500° C. or higher and 1,000° or lower has been proposed (for example, refer to Japanese Laid-open Patent Publication No. 2004-014340, Japanese Laid-open Patent Publication No. 2004-014341, and Japanese Laid-open Patent Publication No. 2001-015111).

In addition, a cathode material for a lithium-ion secondary battery in which the content of carbon in a complex of $LiFePO_4$ and carbon is set in a range of 1 to 20% by mass (refer to Japanese Laid-open Patent Publication No. 2006-032241), a cathode active material for a lithium-ion secondary battery made of a lithium-containing phosphate agglomerate having an average particle diameter of 3 µm or less which is obtained by coating lithium-containing phosphate having an average particle diameter of 1 µm or less with a carbonaceous bonding agent and granulating the lithium-containing phosphate (refer to Japanese Laid-open Patent Publication No. 2009-048958), and the like have been proposed. In these cathode active materials, the density of the granulated body is improved, whereby it is possible to coat the cathode active material with a carbonaceous film in a uniform thickness and improve the battery characteristics. In addition, the density is improved, whereby the density of the cathode active material in electrodes can be increased, and the capacity can be increased, and furthermore, an increase in the density shortens the diffusion distance of lithium ions, enhances the diffusivity of lithium ions, and enables the improvement of ion conductivity in cathodes.

SUMMARY OF THE INVENTION

However, in recent years, even for electrode materials for lithium-ion batteries, there has been a demand for additional improvement of high-rate characteristics and cycle characteristics, and particularly, there is a demand for improvement of high-rate characteristics at a low temperature. However, in the electrode materials of Japanese Laid-open Patent Publication No. 2004-014340, Japanese Laid-open Patent Publication No. 2004-014341, Japanese Laid-open Patent Publication No. 2001-015111, Japanese Laid-open Patent Publication No. 2006-032241, and Japanese Laid-open Patent Publication No. 2009-048958, since a large amount of excess carbon other than the carbonaceous film remains around the electrode active material, the amount of surplus carbon other than the carbonaceous film increases, and thus the distance between active material particles having the carbonaceous film increases, and the contact resistance between the active material particles increases. Therefore, the electrode materials of Japanese Laid-open Patent Publication No. 2004-014340, Japanese Laid-open Patent Publication No. 2004-014341, Japanese Laid-open Patent Publication No. 2001-015111, Japanese Laid-open Patent Publication No. 2006-032241, and Japanese Laid-open Patent Publication No. 2009-048958 have a problem in that the high-rate characteristics are degraded.

The present invention has been made in consideration of the above-described circumstances, and an object of the present invention is to provide an electrode material capable of improving high-rate characteristics at a low temperature, a method for manufacturing the electrode material, an electrode including the electrode material, and a lithium-ion secondary battery including the electrode.

The present inventors and the like carried out intensive studies in order to solve the above-described problems. As a result, it was found that, when the amount of carbon in electrode materials and the volume of micropores having a micropore diameter in a predetermined range are controlled, it is possible to improve the high-rate characteristics of lithium-ion secondary batteries at a low temperature. In addition, on the basis of this finding, the present inventors completed the present invention. That is, the present invention is as described below.

[1] An electrode material for a lithium-ion secondary battery including: an inorganic particle represented by General Formula $LiFe_xMn_{1-x-y}M_yPO_4$ ($0.5 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements); and a carbonaceous film that coats a surface of the inorganic particle, in which an amount of carbon is 0.8% by mass or more and 2.5% by mass or less, and a volume of micropores in a micropore diameter range of 2 nm or more and 200 nm or less is $3 \times 10^{-2}$ cm$^3$/g or more and $3 \times 10^{-1}$ cm$^3$/g or less.

[2] The electrode material for a lithium-ion secondary battery according to [1], in which a powder resistance is 1,000 Ω·cm or less.

[3] The electrode material for a lithium-ion secondary battery according to [2], in which a value of D3/D1 measured by means of Raman spectrometry is 0.58 or more and 0.67 or less.

[4] A method for manufacturing an electrode material for a lithium-ion secondary battery, the method including: a step of immersing an inorganic particle represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements) in an aqueous solution having a pH of 7.3 or more and 10.0 or less; a step of producing a slurry including the inorganic particle immersed in the aqueous solution, a carbonaceous film precursor, and water; a step of producing a dried substance of the slurry by drying the slurry; and a step of calcinating the dried substance in a non-oxidative atmosphere of 500° C. or higher and 1,000° C. or lower, in which an amount of the carbonaceous film precursor blended into 100 parts by mass of the inorganic particle in terms of a carbon element is 1.0 part by mass or more and 5.0 parts by mass or less.

[5] An electrode for a lithium-ion secondary battery including: the electrode material for a lithium-ion secondary battery according to any one of [1] to [3].

[6] A lithium-ion secondary battery including: a cathode; an anode; and a non-aqueous electrolyte, in which the cathode is the electrode for a lithium-ion secondary battery according to [5].

According to the present invention, it is possible to provide an electrode material capable of improving the high-rate characteristics at a low temperature, an electrode including the electrode material, an electrode material providing a lithium-ion secondary battery including the electrode, an electrode including the electrode material, and a lithium-ion secondary battery including the electrode.

DETAILED DESCRIPTION OF THE INVENTION

Hereinafter, the present invention will be described in detail, but the present invention is not limited to the following embodiment.

Electrode Material for Lithium-Ion Secondary Battery

An electrode material for a lithium-ion secondary battery (hereinafter, simply referred to as the electrode material) of the present embodiment includes an inorganic particle represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements); and a carbonaceous film that coats a surface of the inorganic particle, the amount of carbon is 0.8% by mass or more and 2.5% by mass or less, the volume of micropores in a micropore diameter range of 2 nm or more and 10 nm or less is $3 \times 10^{-2}$ cm$^3$/g or more and $3 \times 10^{-1}$ cm$^3$/g or less. Therefore, it is possible to decrease the amount of surplus carbon other than the carbonaceous film and shorten the distance between active material particles coated with the carbonaceous film, and the electron conductivity between the active material particles can be improved. In addition, it becomes possible to supply electrons to reaction points at a high rate and realize electrode materials satisfying high-rate characteristics at a low temperature.

Inorganic Particle

The inorganic particle that is used in the electrode material of the present embodiment is an inorganic particle represented by General Formula $LiFe_xMn_{1-x-y}M_yPO_4$ ($0.05 \leq x \leq 1.0$, $0 \leq y \leq 0.14$, here, M represents at least one element selected from Mg, Ca, Co, Sr, Ba, Ti, Zn, B, Al, Ga, In, Si, Ge, and rare earth elements). Meanwhile, the rare earth element refers to the 15 elements of La, Ce, Pr, Nd, Pm, Sm, Eu, Gd, Tb, Dy, Ho, Er, Tm, Yb, and Lu which belong to the lanthanum series. In addition, the inorganic particle that is used in the electrode material of the present embodiment may be one kind of inorganic particle represented by General Formula $LiFe_xMn_{1-x-y}M_yPO_4$ or an inorganic particle formed of a combination of two or more kinds thereof.

The specific surface area of the inorganic particle is preferably 5 m$^2$/g or more and 20 m$^2$/g or less and more preferably 9 m$^2$/g or more and 13 m$^2$/g or less. When the specific surface area of the inorganic particle is 5 m$^2$/g or more, the time taken for lithium ions and electrons to migrate among the inorganic particles is shortened, and it is possible to make the output characteristics of lithium-ion secondary batteries favorable. When the specific surface area of the inorganic particle is 20 m$^2$/g or less, it is possible to suppress the weight of the carbonaceous film being increased due to an increase in the specific surface area of the inorganic particle and increase the charge and discharge capacity.

Carbonaceous Film

The carbonaceous film coats the surface of the inorganic particle and improves the electron conductivity of the electrode material. The coating ratio of the carbonaceous film is preferably 50% or more and more preferably 70% or more. When the coating ratio of the carbonaceous film is 50% or more, electron supply from the carbonaceous film becomes favorable, an intercalation and deintercalation reaction of lithium ions at the reaction points on the surface of the inorganic particle becomes fast, and the output characteristics are also improved.

The coating ratio of the carbonaceous film can be measured using a transmission electron microscope (TEM), an energy-dispersive X-ray spectroscope (EDX), or the like.

The average film thickness of the carbonaceous film is preferably 0.5 nm or more and 3.0 nm or less and more preferably 1.0 nm or more and 2.0 nm or less. When the average film thickness of the carbonaceous film is 0.5 nm or more, it is possible to sufficiently ensure the electron conductivity of the electrode material, consequently, the internal resistance of batteries decreases, and it is possible to suppress voltage drop at a high charge-discharge rate. When the average film thickness of the carbonaceous film is 3.0 nm or less, it is possible to suppress voltage drop at a high charge-discharge rate which is caused by an increase in the migration distance of lithium ions in the carbonaceous film having a slow diffusion rate of lithium ions.

Meanwhile, the "internal resistance" mentioned herein mainly refers to the sum of charge migration resistance and lithium ion migration resistance. The charge migration resistance is inversely proportional to the film thickness of the carbonaceous film and the density and crystallinity of the carbonaceous film, and the lithium ion migration resistance is inversely proportional to the film thickness of the carbonaceous film and the density and crystallinity of the carbonaceous film.

As a method for evaluating the internal resistance, for example, a current-rest method or the like is used. In the current-rest method, the internal resistance is measured as the sum of wire resistance, contact resistance, charge migration resistance, lithium ion migration resistance, lithium reaction resistance in cathodes and anodes, interelectrode resistance determined by the distance between cathodes and anodes, the solvation of lithium ions, resistance regarding desolvation, and the solid electrolyte interface (SEI) migration resistance of lithium ions.

The coating ratio of the carbonaceous film to the inorganic particle is preferably 60% or more and more preferably 80% or more and 95% or less. When the coating ratio of the carbonaceous film is 60% or more, the coating effect of the carbonaceous film is sufficiently obtained.

The film thickness of the carbonaceous film can be measured using a transmission electron microscope.

The density of the carbonaceous film, which is computed using the amount of carbon in the carbonaceous film, the average film thickness of the carbonaceous film, the coating ratio of the carbonaceous film, and the specific surface area of the electrode material, is preferably 0.3 g/cm$^3$ or more and 1.5 g/cm$^3$ or less and more preferably 0.4 g/cm$^3$ or more and 1.0 g/cm$^3$ or less.

Here, the reasons for limiting the density of the carbonaceous film in the above-described range are as described below. When the density of the carbonaceous film, which is computed using the amount of carbon in the carbonaceous film, is 0.3 g/cm$^3$ or more, the carbonaceous film exhibits sufficient electron conductivity. On the other hand, when the density of the carbonaceous film is 1.5 g/cm$^3$ or less, the amount of the fine crystals of graphite made of a lamellar structure in the carbonaceous film is small, and thus the fine crystals of graphite do not generate steric hindrance during the diffusion of lithium ions in the carbonaceous film. Therefore, the lithium-ion migration resistance does not increase. As a result, the internal resistance of the lithium-ion secondary batteries does not increase, and voltage does not drop at the high charge-discharge rate of lithium-ion secondary batteries.

Amount of Carbon

The amount of carbon in the electrode material is preferably 0.8% by mass or more and 2.5% by mass or less, more preferably 0.9% by mass or more and 2.0% by mass or less, and still more preferably 1.0% by mass or more and 1.5% by mass or less.

When the amount of carbon in the electrode material is less than 0.8% by mass, it is not possible to improve the electron conductivity of the electrode material, and there are cases in which the high-output characteristics deteriorate. In addition, when the amount of carbon in the electrode material is more than 2.5% by mass, there are cases in which the amount of carbon not contributing to the improvement of the electron conductivity increases and thus the charge and discharge capacity decreases.

Volume of Micropores

The volume of micropores having a micropore diameter in a range of 2 nm or more and 200 nm or less in the electrode material is $3\times10^{-2}$ cm$^3$/g or more and $3\times10^{-1}$ cm$^3$/g or less, preferably $4\times10^{-2}$ cm$^3$/g or more and $2.7\times10^{-1}$ cm$^3$/g or less, and more preferably $4.5\times10^{-2}$ cm$^3$/g or more and $2.5\times10^{-1}$ cm$^3$/g or less.

When the volume of micropores having a micropore diameter in a range of 2 nm or more and 200 nm or less in the electrode material is less than $3\times10^{-2}$ cm$^3$/g or more than $3\times10^{-1}$ cm$^3$/g, at least one of the high-rate characteristics or the cycle characteristics become poor.

Powder Resistance

The powder resistance of the electrode material is preferably 1,000 Ω·cm or less, more preferably 900 Ω·cm or less, and still more preferably 870 Ω·cm or less. The powder resistance of the electrode material can be measured using a four-point measurement in which the electrode material is injected into a mold and is pressed at a pressure of 16 kN so as to produce a compact and four probes are brought into contact with the surface of the compact.

When the powder resistance of the electrode material is 1,000 Ω·cm or less, it is possible to improve the electron conductivity of electrodes for a lithium-ion secondary battery to which the electrode material is applied and make the high-rate characteristics at a low temperature favorable.

Amount of Surplus Carbon

As described above, when the amount of surplus carbon other than the carbonaceous film increases, the distance between the active material particles having the carbonaceous film increases, and the contact resistance between the active material particles increases. The amount of surplus carbon other than the carbonaceous film included in the electrode material (hereinafter, referred to as the amount of surplus carbon) can be evaluated using the value of D3/D1 measured by means of Raman spectrometry. Meanwhile, D3 is the height between the crests of G band and D band peaks appearing near 550 to 680 cm$^{-1}$ in a visible light laser at a wavelength of 532 nm, and D1 is the height of the D band peak appearing near 1,200 to 1,400 cm$^{-1}$ in the visible light laser at a wavelength of 532 nm.

The value of D3/D1 measured by means of Raman spectrometry is preferably 0.58 or more and 0.67 or less, more preferably 0.58 or more and 0.63 or less, and still more preferably 0.58 or more and 0.60 or less. When the value of D3/D1 measured by means of Raman spectrometry is 0.58 or more and 0.67 or less, it is possible to decrease the amount of surplus carbon other than the carbonaceous film and shorten the distance between active material particles coated with the carbonaceous film, and the electron conductivity between the active material particles can be improved. In addition, it becomes possible to supply electrons to reaction points at a high rate and realize electrode materials satisfying high-rate characteristics at a low temperature.

Average Primary Particle Diameter

The average primary particle diameter of the electrode material of the present embodiment is preferably 0.01 μm or more and 5 μm or less and more preferably 0.02 μm or more and 2 μm or less.

When the average primary particle diameter of the electrode material is 0.01 μm or more, an increase in the specific surface area of the electrode material suppresses an increase in the mass of necessary carbon, and it is possible to suppress a decrease in the charge and discharge capacity of lithium-ion secondary batteries. On the other hand, when the average primary particle diameter of the electrode material is 5 μm or less, it is possible to suppress the extension of the time taken for lithium ions or electrons to migrate in the electrode material. Therefore, it is possible to suppress the deterioration of output characteristics caused by an increase in the internal resistance of lithium-ion secondary batteries.

Average Secondary Particle Diameter

The average secondary particle diameter of agglomerated particles of the electrode material which are formed by the agglomeration of a plurality of the primary particles of the electrode material is preferably 0.5 μm or more and 20 μm or less and more preferably 0.7 μm or more and 10 μm or less. When the average secondary particle diameter of the agglomerated particles is 0.5 μm or more, it is possible to suppress the amounts of the conductive auxiliary agent and the binding agent blended during the preparation of paste for forming the electrode by mixing the electrode material, the conductive auxiliary agent, the binder resin (binding agent), and the solvent, and it is possible to increase the battery capacity of the lithium-ion secondary battery per unit mass of an electrode material layer. On the other hand, when the average secondary particle diameter of the agglomerated particles is 20 μm or less, it is possible to improve the dispersibility and uniformity of the conductive auxiliary agent or the binding agent in the electrode material layer. As a result, lithium-ion secondary batteries for which the electrode material of the present embodiment is used are capable of increasing the discharge capacity during high-speed charging and discharging.

Method for Manufacturing Electrode Material

A method for manufacturing the electrode material of the present embodiment includes a step (A) of immersing an inorganic particle represented by General Formula LiFe$_x$Mn$_{1-x-y}$M$_y$PO$_4$ (0.05≤x≤1.0, 0≤y≤0.14, here, M represents at least one element selected from Mg, Ca, Co, Sr, Ba, Ti, Zn, B, Al, Ga, In, Si, Ge, and rare earth elements) in an aqueous solution having a pH of 7.5 or more and 10.0 or less, a step (B) of producing a slurry including the inorganic particle immersed in the aqueous solution, a carbonaceous film precursor, and water, a step (C) of producing a dried substance of the slurry by drying the slurry, and a step (D) of calcinating the dried substance in a non-oxidative atmosphere of 500° C. or higher and 1,000° C. or lower.

Step (A)

In Step (A), the inorganic particle represented by General Formula LiFe$_x$Mn$_{1-x-y}$M$_y$PO$_4$ (0.05≤x≤1.0, 0≤y≤0.14, here, M represents at least one element selected from Mg, Ca, Co, Sr, Ba, Ti, Zn, B, Al, Ga, In, Si, Ge, and rare earth elements) is immersed in an aqueous solution having a pH of 7.5 or more and 10.0 or less.

The inorganic particle that is used in the method for manufacturing the electrode material are represented by General Formula LiFe$_x$Mn$_{1-x-y}$M$_y$PO$_4$ (0.05≤x≤1.0, 0≤y≤0.14, here, M represents at least one element selected from Mg, Ca, Co, Sr, Ba, Ti, Zn, B, Al, Ga, In, Si, Ge, and rare earth elements).

For example, LiFe$_x$Mn$_{1-x-y}$M$_y$PO$_4$ can be obtained by hydrothermally synthesizing a slurry-form mixture obtained by mixing a Li source, a divalent iron salt, a phosphate compound, and water using a pressure-resistant airtight container. The Li source is, for example, one element selected from the group consisting of lithium salts such as lithium acetate (LiCH$_3$COO) and lithium chloride (LiCl) and lithium hydroxide (LiOH). Examples of the divalent iron salt include iron (II) chloride (FeCl$_2$), iron (II)acetate (Fe(CH$_3$COO)$_2$), iron (II) sulfate(FeSO$_4$), and the like. Examples of the phosphate compound include phosphoric acid (H$_3$PO$_4$), ammoniumdihydrogenphosphate (NH$_4$H$_2$PO$_4$) diammonium phosphate ((NH$_4$)$_2$HPO$_4$), and the like.

Solution

The pH of the aqueous solution in which the inorganic particle is immersed is 7.3 or more and 10.0 or less, preferably 7.5 or more and 9.5 or less, and more preferably 7.6 or more and 9.2 or less.

When the pH of the aqueous solution in which the inorganic particle is immersed is less than 7.3 or more than 10.0, there are cases in which it is difficult to generate fine iron oxide on the surface of the inorganic particle. Meanwhile, iron oxide generated in Step (B) is reduced by hydrogen that is emitted from an organic compound during the calcination of a dried substance described below, the iron oxide is removed from the electrode material, micropores are formed in the carbonaceous film that coats the surface of the inorganic particle, and surplus carbon is likely to be oxidized and decomposed during the calcination step, whereby it is possible to control the volume of micropores having a micropore diameter in a range of 2 nm or more and 200 nm or less in the electrode material to 3×10$^{-2}$ cm$^3$/g or more and 3×10$^{-1}$ cm$^3$/g or less.

The aqueous solution in which the inorganic particle is immersed is not particularly limited as long as the pH of the aqueous solution is 7.3 or more and 10.0 or less, preferably 7.5 or more and 9.5 or less, and more preferably 7.6 or more and 9.2 or less. The aqueous solution is, for example, an aqueous solution including at least one element selected from the group consisting of LiOH and NH$_3$.

The immersion duration during which the inorganic particle is immersed is preferably 1 hour or more and 24 hours or less and more preferably 2 hours or more and 12 hours or less from the viewpoint of sufficient generation of iron oxide from the inorganic particle.

Step (B)

In Step (B), a slurry including the inorganic particle immersed in the aqueous solution, the carbonaceous film precursor, and water is produced.

The amount of the carbonaceous film precursor blended into 100 parts by mass of the inorganic particle in terms of a carbon element is 1.0 part by mass or more and 5.0 parts by mass or less and preferably 2.5 parts by mass or more and 10 parts by mass or less. When the amount of the carbonaceous film precursor blended into 100 parts by mass of the inorganic particle in terms of a carbon element is 1.0 part by mass or more and 5.0 parts by mass or less, it is possible to set the amount of carbon in the electrode material to approximately 0.8% by mass or more and 2.5% by mass or less.

Examples of the organic compound that is used as the carbonaceous film precursor include polyvinyl alcohol (PVA), polyvinylpyrrolidone, cellulose, starch, gelatin, carboxymethyl cellulose, methyl cellulose, hydroxymethyl cellulose, hydroxyethyl cellulose, polystyrene sulfonate, polyacrylamide, polyvinyl acetate, glucose, fructose, galactose, mannose, maltose, sucrose, lactose, arabinose, glycogen, pectin, alginic acid, glucomannan, chitin, hyaluronic acid, chondroitin, agarose, polyethers, divalent alcohols, and trivalent alcohols. One of these organic compounds may be used singly or two or more organic compounds may be used in mixture.

The blending ratio of the organic compound to the inorganic particle is preferably 0.8 parts by mass or more and 2.5 parts by mass or less with respect to 100 parts by mass of the inorganic particle when the total amount of the organic compound is converted to the amount of carbon.

Here, when the blending ratio of the organic compound in terms of the amount of carbon is 0.8 parts by mass or more, the discharge capacity at a high-speed charge and discharge rate increases in a case in which secondary batteries are formed, and it becomes possible to realize sufficient charge and discharge rate performance. When the blending ratio of the organic compound in terms of the amount of carbon is 2.5 parts by mass or less, it is possible to set the average film thickness of the carbonaceous film to 3.0 nm or less.

The inorganic particle and the organic compound are dissolved or dispersed in water, thereby preparing a homogeneous slurry. During the dissolution or dispersion, a dispersant may be added thereto.

A method for dissolving or dispersing the inorganic particle and the organic compound in water is not particularly limited as long as the inorganic particle is dispersed, and the organic compound is dissolved or dispersed. Examples of an apparatus for dissolving or dispersing the organic compound include a medium stirring-type dispersing apparatus that stirs a medium particle at a high speed such as a planetary ball mill, an oscillation ballmill, a beadmill, a paint shaker, or an attritor. In addition, the organic compound is preferably sugar containing a large amount of oxygen in the structure. Simple sugar and double sugar are more preferred. When the amount of oxygen is large, a large number of places are cleaved during calcination, and micropores are easily formed in carbon layers.

During the dissolution or dispersion, it is preferable to disperse the inorganic particle in a primary particle form, then, add the organic compound thereto, and stir the organic compound so as to dissolve the organic compound. In such a case, the surface of the primary particle of the inorganic particle is coated with the organic compound, and consequently, carbon derived from the compound is uniformly interposed among the primary particles of the inorganic particle.

Step (C)

In Step (C), the slurry is dried, thereby producing a dried substance of the slurry. For example, the slurry is sprayed and dried in a high-temperature atmosphere, for example, in the atmosphere at 70° C. or higher and 250° C. or lower.

Step (D)

In Step (D), the dried substance is calcinated at a calcination temperature of 500° C. or higher and 1,000° C. or lower and preferably 600° C. or higher and 900° C. or lower. The calcination duration is, for example, 0.1 hours or longer and 40 hours or shorter.

As described above, iron oxide generated in Step (B) is reduced by hydrogen that is emitted from the organic compound in this step, and the iron oxide is removed from the electrode material. In addition, micropores are formed in the carbonaceous film that coats the surface of the inorganic particle, and surplus carbon other than the carbonaceous film around the active material is oxidized and decomposed, whereby it is possible to control the volume of micropores having a micropore diameter in a range of 2 nm or more and 200 nm or less in the electrode material to $3 \times 10^{-2}$ cm$^3$/g or more and $3 \times 10^{-1}$ cm$^3$/g or less.

When the calcination temperature is lower than 500° C., the decomposition and reaction of the organic compound in the dried substance obtained by drying the slurry does not sufficiently proceed, and there are cases in which the organic compound is not sufficiently carbonized. As a result, there are cases in which a high-resistance decomposed substance of the organic compound is generated in the obtained electrode material. When the calcination temperature is higher than 1,000° C., there are cases in which Li in the inorganic particle is evaporated and thus the composition of the inorganic particle is deviated. When the composition is deviated, the grain growth of the inorganic particle is accelerated, consequently, the discharge capacity at a high-speed charge and discharge rate is decreased, and there are cases in which it is difficult to realize sufficient charge and discharge rate performance.

The non-oxidative atmosphere is preferably an inert atmosphere filled with nitrogen ($N_2$), argon (Ar), or the like, and, in a case in which it is more necessary to suppress oxidation, a reducing atmosphere including approximately several percents by volume of a reducing gas such as hydrogen ($H_2$) is preferred.

In this calcination step, it is possible to control the micropore diameter distribution of the electrode material to be obtained by appropriately adjusting the conditions for calcinating the dried substance of the slurry, for example, the temperature-rise rate, the peak holding temperature, the holding duration, and the like.

By means of the above-described steps, the surface of the primary particle of the inorganic particle is coated with carbon generated by the thermal decomposition of the organic compound in the dried substance, and an electrode material made of a secondary particle in which carbon is interposed between the primary particles of the inorganic particle can be obtained.

Electrode for Lithium-Ion Secondary Battery

An electrode for a lithium-ion secondary battery of the present embodiment (hereinafter, simply referred to as the electrode) includes the electrode material of the present embodiment.

In order to produce an electrode of the present embodiment, the electrode material, a binding agent made of a binder resin, and a solvent are mixed together, thereby preparing paint for electrode formation or paste for electrode formation. At this time, a conductive auxiliary agent such as carbon black may be added thereto if necessary.

As the binding agent, that is, the binder resin, for example, a polytetrafluoroethylene (PTFE) resin, a polyvinylidene fluoride (PVdF) resin, fluorine rubber, or the like is preferably used.

The amount of the binder resin blended into the electrode material is not particularly limited and is, for example, set to 1 part by mass or more and 30 parts by mass or less and preferably set to 3 parts by mass or more and 20 parts by mass or less with respect to 100 parts by mass of the electrode material.

Examples of the solvent that is used for the paint for electrode formation and the paste for electrode formation include water; alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetyl acetone, and cyclohexanone, amides such as dimethyl formamide, N,N-dimethylacetoacetamide, and N-methyl pyrrolidone, glycols such as ethylene glycol, diethylene glycol, and propylene glycol, and the like. These aqueous solvents may be singly used or in a mixture form of two or more aqueous solvents.

Next, the paint for electrode formation or the paste for electrode formation is applied to one surface of a metal foil and then is dried, thereby obtaining the metal foil in which a coated film made of a mixture of the electrode material and the binder resin is formed on one surface.

Next, the coated film is pressed by pressure and dried, thereby producing a current collector (electrode) having an electrode material layer on one surface of the metal foil.

In the above-described manner, it is possible to produce electrodes capable of improving electron conductivity without impairing the lithium-ion conductivity of the present embodiment.

Lithium-Ion Secondary Battery

A lithium-ion secondary battery of the present embodiment has the electrode of the present embodiment as a cathode.

In the lithium-ion secondary battery, since the electrode of the present embodiment is used as the cathode, it is possible to suppress the internal resistance at a low level. As a result, there is no concern that the voltage may significantly drop, and it is possible to provide lithium-ion secondary batteries capable of high-speed charge and discharge.

EXAMPLES

Hereinafter, the present invention will be described in detail using examples, but the present invention is not limited to the following examples.

Specimens of Examples 1 to 5 and Comparative Examples 1 to 6 were produced in the following manner.

Example 1

Production of Electrode Material

Lithium acetate ($LiCH_3COO$) (4 mol), iron (II) sulfate ($FeSO_4$) (2 mol), and phosphoric acid ($H_3PO_4$) (2 mol) were mixed with water (2 liter (L)) so that the total amount reached 4 L, thereby preparing a homogeneous slurry-form mixture.

Next, this mixture was stored in a pressure-resistant airtight container having a capacity of 8 L and was hydrothermally synthesized at 120° C. for one hour.

Next, the obtained precipitate was washed with water, thereby obtaining a cake-form electrode active material (inorganic particle).

Next, the electrode active material was immersed for eight hours in an aqueous solution of lithium hydroxide prepared so that the pH reached 7.6, thereby treating the surface.

Next, this electrode active material (75 gin terms of solid contents), water (175 g), and zirconia beads having a diameter of 0.1 mm (250 g) as a medium were injected into a ball mill, and a dispersion treatment was carried out, thereby obtaining a slurry.

Next, lactose (3.4 g) was injected into the obtained slurry, was stirred for 12 hours, was sprayed in the atmosphere at 180° C., and was dried, thereby obtaining a dried substance.

Next, the obtained dried substance was calcinated in a nitrogen atmosphere at 800° C. for 0.5 hours, thereby obtaining a specimen of Example 1.

Example 2

A specimen of Example 2 was produced in the same manner as in Example 1 except for the fact that an aqueous solution of lithium hydroxide was prepared so that the pH reached 8.5.

Example 3

A specimen of Example 3 was produced in the same manner as in Example 1 except for the fact that an aqueous solution of lithium hydroxide was prepared so that the pH reached 9.2.

Example 4

A specimen of Example 4 was produced in the same manner as in Example 1 except for the fact that an aqueous solution of lithium hydroxide was prepared so that the pH reached 7.6 and fructose (3.4 g) was injected as a carbon raw material.

Example 5

A specimen of Example 5 was produced in the same manner as in Example 4 except for the fact that an aqueous solution of lithium hydroxide was prepared so that the pH reached 8.5.

Example 6

A specimen of Example 6 was produced in the same manner as in Example 4 except for the fact that an aqueous solution of lithium hydroxide was prepared so that the pH reached 9.2.

Comparative Example 1

A specimen of Comparative Example 1 was produced in the same manner as in Example 1 except for the fact that the pH of the aqueous solution of lithium hydroxide used in the production of the specimen of Example 1 was set to 7.6 and phenol (1.9 g) was injected.

Comparative Example 2

A specimen of Comparative Example 2 was produced in the same manner as in Example 1 except for the fact that the pH of the aqueous solution of lithium hydroxide used in the production of the specimen of Example 1 was set to 8.5 and phenol (1.9 g) was injected.

Comparative Example 3

A specimen of Comparative Example 3 was produced in the same manner as in Example 1 except for the fact that the pH of the aqueous solution of lithium hydroxide used in the production of the specimen of Example 1 was set to 9.2 and phenol (1.9 g) was injected.

Comparative Example 4

A specimen of Comparative Example 5 was produced in the same manner as in Example 1 except for the fact that an aqueous solution of lithium hydroxide was prepared so that the pH reached 10.5.

Comparative Example 5

A specimen of Comparative Example 6 was produced in the same manner as in Example 1 except for the fact that an aqueous solution of lithium hydroxide was prepared so that the pH reached 12.

Evaluation of Electrode Materials

On the specimens of Examples 1 to 6 and Comparative Examples 1 to 5, the following evaluations were performed.

1. Volume of Micropores Having Micropore Diameter in Range of 2 nm or More and 200 nm or Less A nitrogen adsorption measurement was performed using a nitrogen adsorption measurement instrument (manufactured by MicrotracBEL Corp., model No.: BELSORP-max), the pore size distributions of the specimens of Example 1 to 6 and Comparative Examples 1 to 7 having a micropore diameter in a range of 2 nm or more and 200 nm or less were analyzed using a BJH method, and the volumes Vp of micropores of 2 nm or more and 200 nm or less were obtained.

2. Amount of Carbon

The amounts of carbon of the specimens of Example 1 to 6 and Comparative Examples 1 to 5 were measured using a carbon analyzer (manufactured by Horiba Ltd., model No.: EMIA-920V).

3. Specific Surface Area

The specific surface areas of the electrode active materials in the specimens of Example 1 to 6 and Comparative Examples 1 to 5 were respectively measured using a specific surface area meter (manufactured by Mountech Co., Ltd., model No.: MacsorbHM MODEL 1208).

4. Powder Resistance

The specimens of Example 1 to 6 and Comparative Examples 1 to 5 were respectively injected into a mold and were pressed at a pressure of 16 kN, thereby respectively producing compacts. The powder resistances of the specimens of Example 1 to 6 and Comparative Examples 1 to 5 were measured using a four point measurement in which four probes were brought into contact with the surface of the compact.

5. Computation of Amount of Surplus Carbon Through Raman Spectrometric Measurement Using a micro Raman spectrometric measurement instrument (manufactured by Horiba Ltd, LabRAM R EVOLTION), the dark filter was set to 0.1%, the spectroscope was set to 1,300 $cm^{-1}$, the exposure time was set to 50 seconds, the cumulated number was set to ten times, the grating was set to 600 gr/mm, and the confocal hole was set to 150. The height between the crests of G band and D band peaks appearing near 550 to 680 $cm^{-1}$ in a visible light laser at a wavelength of 532 nm was represented by D3, the height of the D band peak appearing near 1,200 to 1,400 $cm^{-1}$ was represented by D1, and a value obtained by dividing D1 by D3 was computed as the amount of surplus carbon.

6. 10C Discharge Capacity at 0° C.

The 10C discharge capacity at 0° C. was evaluated using lithium-ion secondary batteries produced using the specimens of Example 1 to 6 and Comparative Examples 1 to 6.

Production of Lithium-Ion Battery

Each of the specimens of Example 1 to 6 and Comparative Examples 1 to 6 as an electrode material, polyvinylidene fluoride (PVdF) as a binder, and acetylene black (AB) as a conductive auxiliary agent were mixed together so that the mass ratio reached 90:5:5, and furthermore, N-methyl-2-pyrrolidone (NMP) was added thereto as a solvent so as to impart flowability, thereby producing a slurry.

Next, the slurry was applied onto a 15 μm-thick aluminum (Al) foil and was dried. After that was pressed at a pressure of 600 kgf/$cm^2$, thereby producing a cathode for a lithium-ion secondary battery having an electrode area of 2 square centimeters and an electrode density of 1.6 g/cc.

The cathode and a lithium metal piece as an anode were disposed in a coin cell container having a diameter of 2 cm and a thickness of 3.2 mm, and a porous polypropylene separator having a thickness of 25 μm was disposed between the cathode and the anode, thereby producing a member for a battery.

Meanwhile, ethylene carbonate and ethyl methyl carbonate were mixed together at (a mass ratio of) 1:1, and furthermore, a 1M $LiPF_6$ solution was added, thereby producing an electrolyte solution having lithium-ion conductivity.

Next, the member for a battery was immersed in the electrolyte solution, thereby producing a lithium-ion secondary battery.

Charge and Discharge Capacity

The 10C discharge capacity at 0° C. of the produced lithium-ion secondary battery was computed using a battery charge and discharge device (manufactured by Hokuto Denko Corp., Model No.: SM8).

TABLE 1

| | Carbon source | Amount of carbon source prepared % | pH of surface treatment solution | Volume of micropores in range of 2 to 200 nm $cm^3$/g | Amount of carbon % | BET $m^2$/g | Powder resistance Ω · cm | D3/D1 | 10 C discharge capacity @ 0° C. [mAh/g] |
|---|---|---|---|---|---|---|---|---|---|
| Example 1 | Lactose | 2 | 7.6 | 0.23 | 1.45 | 14.5 | 782 | 0.60 | 100 |
| Example 2 | Lactose | 2 | 8.5 | 0.13 | 1.38 | 14.4 | 814 | 0.59 | 105 |
| Example 3 | Lactose | 2 | 9.2 | 0.05 | 1.32 | 14.6 | 863 | 0.58 | 111 |

TABLE 1-continued

|  | Carbon source | Amount of carbon source prepared % | pH of surface treatment solution | Volume of micropores in range of 2 to 200 nm cm$^3$/g | Amount of carbon % | BET m$^2$/g | Powder resistance Ω·cm | D3/D1 | 10 C discharge capacity @ 0° C. [mAh/g] |
|---|---|---|---|---|---|---|---|---|---|
| Example 4 | Fructose | 2 | 7.6 | 0.22 | 1.46 | 14.8 | 806 | 0.60 | 102 |
| Example 5 | Fructose | 2 | 8.5 | 0.13 | 1.38 | 14.1 | 853 | 0.59 | 104 |
| Example 6 | Fructose | 2 | 9.2 | 0.07 | 1.31 | 14.9 | 867 | 0.58 | 113 |
| Comparative Example 1 | Phenol | 2 | 7.6 | 0.44 | 1.80 | 20.1 | 101 | 0.72 | 50 |
| Comparative Example 2 | Phenol | 2 | 8.5 | 0.41 | 1.75 | 17.5 | 313 | 0.70 | 50 |
| Comparative Example 3 | Phenol | 2 | 9.2 | 0.35 | 1.44 | 16.6 | 588 | 0.70 | 71 |
| Comparative Example 4 | Lactose | 2 | 10.5 | 0.025 | 1.22 | 13.6 | 1062 | 0.57 | 91 |
| Comparative Example 5 | Lactose | 2 | 12.0 | 0.025 | 1.20 | 13.1 | 1288 | 0.55 | 81 |

From the comparison between Examples 1 to 6 and Comparative Examples 1 to 5, it was found that, when an electrode material in which the amount of carbon was 0.8% by mass or more and 2.5% by mass or more and the volume of micropores having a micropore diameter in a range of 2 nm or more and 200 nm or less is $3\times10^{-2}$ cm$^3$/g or more and $3\times10^{-1}$ cm$^3$/g or less is used, the high-rate characteristics of the lithium-ion secondary batteries at a low temperature become favorable.

In addition, from the comparison between Examples 1 to 6 and Comparative Examples 1 to 5, it was found that, when an inorganic particle was immersed in an aqueous solution having a pH of 7.3 or more and 10.0 or less, and the amount of the carbonaceous film precursor blended into 100 parts by mass of the inorganic particle in terms of a carbon element is set to 1.0 part by mass or more and 5.0 parts by mass or less, it is possible to obtain electrode materials capable of improving the high-rate characteristics at a low temperature.

What is claimed is:

1. An electrode material for a lithium-ion secondary battery comprising:
    an inorganic particle represented by General Formula LiFe$_x$Mn$_{1-x-y}$M$_y$PO$_4$ (0.02≤x≤1.0, 0≤y·0.14, here, M represents at least one element selected from Mg, Ca, Co, Sr, Ba, Ti, Zn, B, Al, Ga, In, Si, Ge, and rare earth elements); and
    a carbonaceous film that coats a surface of the inorganic particle,
    wherein an amount of carbon is 0.8% by mass or more and 2.5% by mass or less, and
    the carbonaceous film having a volume of micropores in a micropore diameter range of 2 nm or more and 200 nm or less is $3\times10^{-2}$ cm$^3$/g or more and $3\times10^{-1}$ cm$^3$/g or less.

2. The electrode material for a lithium-ion secondary battery according to claim 1,
    wherein a powder resistance is 1,000 Ω·cm or less.

3. The electrode material for a lithium-ion secondary battery according to claim 2,
    wherein a value of D3/D1 measured by means of Raman spectrometry is 0.58 or more and 0.67 or less;
    wherein D3 is the height between crests of G band and D band peaks appearing near 550 to 680 cm$^{-1}$ in a visible light laser at a wavelength of 532 nm, and D1 is the height of a D band peak appearing near 1,200 to 1,400 cm$^{-1}$ in the visible light laser at a wavelength of 532 nm.

4. An electrode for a lithium-ion secondary battery comprising:
    the electrode material for a lithium-ion secondary battery according to claim 1.

5. A lithium-ion secondary battery comprising:
    a cathode;
    an anode; and
    a non-aqueous electrolyte,
    wherein the cathode is the electrode for a lithium-ion secondary battery according to claim 4.

6. A method for manufacturing the electrode material for a lithium-ion secondary battery according to claim 1, the method comprising:
    a step of immersing an inorganic particle represented by General Formula LiFe$_x$Mn$_{1-x-y}$M$_y$PO$_4$ (0.05≤x≤1.0, 0≤y≤0.14, here, M represents at least one element selected from Mg, Ca, Co, Sr, Ba, Ti, Zn, B, Al, Ga, In, Si, Ge, and rare earth elements) in an aqueous solution having a pH of 7.3 or more and 10.0 or less;
    a step of producing a slurry including the inorganic particle immersed in the aqueous solution, a carbonaceous film precursor, and water;
    a step of producing a dried substance of the slurry by drying the slurry; and
    a step of calcinating the dried substance in a non-oxidative atmosphere of 500° C. or higher and 1,000° C. or lower,
    wherein an amount of the carbonaceous film precursor blended into 100 parts by mass of the inorganic particle in terms of a carbon element is 1.0 part by mass or more and 5.0 parts by mass or less.

* * * * *

UNITED STATES PATENT AND TRADEMARK OFFICE
CERTIFICATE OF CORRECTION

PATENT NO.           : 10,431,817 B2
APPLICATION NO.      : 15/716883
DATED                : October 1, 2019
INVENTOR(S)          : H. Yasumiishi et al.

Page 1 of 1

It is certified that error appears in the above-identified patent and that said Letters Patent is hereby corrected as shown below:

In the Claims

At Column 15, Line 43 (Claim 1, Line 4), please change "(0.02" to -- (0.05 --.

Signed and Sealed this
Seventh Day of April, 2020

Andrei Iancu
*Director of the United States Patent and Trademark Office*